(12) United States Patent
Nyblin et al.

(10) Patent No.: US 6,916,213 B2
(45) Date of Patent: Jul. 12, 2005

(54) CONNECTION BASE

(75) Inventors: Henrik Nyblin, Vaasa (FI); Bjarne Nylund, Kvevlax (FI); Reijo Hyyryläinen, Vaasa (FI); Erkki Pesonen, Tuupovaara (FI); Heikki Nevalainen, Kovero (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/447,278

(22) Filed: May 29, 2003

(65) Prior Publication Data

US 2004/0072474 A1 Apr. 15, 2004

Related U.S. Application Data

(63) Continuation of application No. PCT/FI01/01045, filed on Nov. 30, 2001.

(30) Foreign Application Priority Data

Dec. 1, 2000 (FI) .............................................. 20002644

(51) Int. Cl.⁷ ................................................. H01R 9/22
(52) U.S. Cl. ...................................... 439/709; 439/801
(58) Field of Search ............................... 439/709–712, 439/715, 717, 801, 808, 812

(56) References Cited

U.S. PATENT DOCUMENTS

| | | | | |
|---|---|---|---|---|
| 4,210,379 A | * | 7/1980 | Vachhani et al. | ........... 439/406 |
| 5,645,457 A | * | 7/1997 | Hirayama et al. | .......... 439/801 |
| 5,674,098 A | * | 10/1997 | Inaba et al. | ................. 439/883 |
| 6,220,901 B1 | * | 4/2001 | Fisher et al. | ................ 439/709 |
| 6,293,830 B1 | * | 9/2001 | Park et al. | .................. 439/801 |

OTHER PUBLICATIONS

Patent Abstracts of Japan English summary of JP 10243601A, dated Sep. 11, 1998, entitled "Terminal Box of Main Electric Motor for Vehicle" of Hoshi Katsuyoshi et al.
Patent Abstracts of Japan English summary of JP 11136900A, dated May 21, 1999, entitled "Terminal Box Structure for Electric Apparatus" of Takeda Isamu et al.
English Summary of JP 3207236, dated Sep. 10, 1991, entitled "Terminal Block for Rotating Electric Machine" of Yoshinori Higuchi.
English Abstract of JP 4725133A, dated Feb. 9, 1982, entitled "Terminal Box for Motor" of Seijii Furudate.

* cited by examiner

*Primary Examiner*—Hien Vu
(74) *Attorney, Agent, or Firm*—Dykema Gossett PLLC (57) ABSTRACT

A connection base is presented connecting current supply cables (1) of an electric motor to phase leads (2) of electric motor windings. The connection base comprises, a body (3) made of an insulating material and terminals (4) coupled thereto, the terminals being arranged to comprise at least one angle (α) and at least a first projection (41) and a second projection (42) on the opposite sides of the angle. The body is provided with first reception means (21) for receiving at least the first projection of the terminal and for keeping it in connection with the body. Furthermore the body is provided with second reception means (14, 15) for receiving a fastening means (12, 13) to be arranged at the first projection and for locking to the body. The fastening means being arranged to lock the terminal to the body and to fasten the phase lead to the terminal.

13 Claims, 6 Drawing Sheets

CONNECTION BASE

This application is a Continuation of International Application PCT/FI01/01045 filed on Nov. 30, 2001, which designated the U.S. and was published under PCT Article 21(2) in English.

FIELD OF THE INVENTION

The invention relates to a connection base for connecting current supply cables to an electric motor and, more specifically, for connecting current supply cables to phase leads coupled to electric motor windings. Connection bases of the invention are typically used in electric motors with a supply current of 100 to 1300 A.

BACKGROUND OF THE INVENTION

Electrical power is supplied to an electric motor from a supplying net through current supply cables. At their first end, current supply cables are connected to a centre supplying the electric motor and the second end is connected to the electric motor. A connection to the electric motor is typically carried out in a junction box of the electric motor. The ends of phase leads coupled to the windings of the electric motor stator are led to the junction box, and the current supply cables are coupled to these ends when connected. Depending on the purpose of use, the electric motor is connected to the supplying net by means of a star or a delta connection, i.e. Y or D connection. Depending on the connection manner, the connection of the current supply cables in the junction box of the electric motor is different, and the connection manner is typically selected by mounting connection base elements, i.e. circuit plates, of the junction box according to the Y or D connection.

A prior art connection base consists of a base made of an insulating material, such as plastic, and the bottom surface of the base is coupled to a metallic mounting flange to fasten it to the electric motor, or the base is fastened directly to the bottom of the junction box of the electric motor. The top surface of the plastic base is coupled to roughly U-shaped copper terminals, a three-phase electric motor typically comprising six terminals of that kind. The U-shaped terminal is bent at an angle of 90 degrees. The terminals are arranged on the base so that there are three terminals side by side in two rows, whereby the bases of the U-shaped terminals are against each other. One arm of a terminal is connected to the plastic base by means of a screw connection, for instance. In this case, a counterpart, which receives the screw, has been embedded or cast in the plastic base at its manufacturing stage. The other arm of the U-shaped terminal is connected to a current supply cable of a supplying phase typically by means of a cable lug connection. Thus, the cable lug is tightened to the terminal arm typically by a screw-nut fastening. The phase lead of the winding is connected to the base of the U-shaped terminal in the corresponding connection manner. The arms of the U-shaped terminal, to which the current supply conductors are connected, are also bent at a certain angle towards the centre point of the U-shape.

Such a prior art connection base is, however, associated with a problem. The connection base requires three fastening means, typically screw-nut combinations, for each terminal. The first fastening means is for fastening the terminal to the base, the second for fastening the phase lead to the terminal and the third for fastening the current supply cable to the terminal. Thus, three joint surfaces and three fastening means are required in the terminal. In addition, at the manufacturing stage of the connection base, fastening means, such as screw-receiving components which have to be manually set to the mould at the manufacturing stage, must be embedded in the plastic base of the connection base. Thus, the manufacture of the base is cumbersome and the price of the connection base is disadvantageous.

BRIEF DESCRIPTION OF THE INVENTION

It is an object of the present invention to eliminate prior art disadvantages and provide an improved solution for a connection base for current supply cables of an electric motor. This is achieved by a connection base, the characteristic features of which are defined according to the present invention in the claims.

A connection base of the invention comprises a body made of an insulating material and terminals coupled to the body, the terminals being arranged to comprise at least one angle $\alpha$ and at least a first projection and a second projection on the opposite sides of the angle $\alpha$, and the body is provided with first reception means for receiving at least the first projection of the terminal and for keeping it in connection with the body, and the body is provided with second reception means for receiving a fastening means arranged at the first projection of the terminal and for locking it in connection with the body, whereby said fastening means is arranged to lock the terminal to the body and to fasten the phase lead to the terminal.

More specifically, the arrangement of the invention is characterized in that the terminal and the body are formed in such a manner that by using the same fastening means, i.e. preferably a bolt-screw combination, by which the phase lead of the electric motor winding is connected to the terminal, also the terminal is locked immovably to the body. This provides the substantial advantages that the amount of copper that is required for manufacturing a terminal is about 30 to 40% smaller than in the conventional solution, the number of fastening means required is about 30% smaller and the structure which fastens the terminals to the body facilitates the mounting of phase leads and current supply cables considerably, as only one tool is required for tightening the fastening means.

The preferred embodiments of the invention are disclosed in the dependent claims.

The body of the connection base preferably consists of two similar three-dimensional sections which are attached opposite one another. This provides the advantage that only one mould is required for manufacturing the body. The body is made of an electrically insulating material. Preferably the body is made of a thermoplastic material by injection moulding, in which case the manufacture can be easily automated. The entire body is made of a recyclable thermoplastic material and it does not have any embedded metallic parts.

The terminals of the connection base are formed so as to comprise at least one angle $\alpha$ and, on the opposite sides of the angle $\alpha$, at least a first projection, i.e. a joint surface for the phase lead, and a second projection, i.e. a joint surface for the current supply conductor. The angle $\alpha$ is preferably smaller than 90 degrees. Thus, the shape of the terminal is such that it only comprises the necessary joint surfaces and the parts required for transferring power of the terminal, and this is why the size of the terminal and the amount of copper required can be kept small.

The first reception means, which are at the inner edge of the body of the connection base and at which the fastening means of the phase lead of the terminal is arranged and locked, consist of a cavity provided at the inner edge of the body. The cavity has a shape similar to the base of the fastening means. Hexagonal bolts and nuts are preferably used as fastening means. Thus, the cavity has a hexagonal shape, and the turning of the bolt head or the nut mounted in the cavity is prevented. This provides the advantage that it is considerably easier to mount the phase leads on the conductor, because only one tool, such as a fork spanner, is needed for tightening the fastening means.

On the top surface of the body of the connection base there are the second reception means at which the fastening means of the current supply cable is arranged and locked. The reception means consist of a cavity provided on the top surface of the body, the cross-section of the cavity preferably having a shape similar to the base of the fastening means. Conventional hexagonal bolts and nuts are preferably used as fastening means. Thus, the cavity has preferably a hexagonal shape, and the turning of the bolt head or the nut mounted in the cavity is prevented. In addition, a spring element, such as a helical spring, whose length is equal to the depth of the cavity, is arranged in the cavity, the function of which spring element is to support the fastening means to facilitate the mounting of the current supply cable and to bend downwards when the circuit plates of the connection device are mounted in their places.

When viewed from the direction of the inner edge, the profile of the top surface of the section forming the body of the connection base is angular, whereby the centre part of the section is higher than the side parts of the section and the side parts of the top surface of the section are bent downwards at an angle $\beta$ to the centre part. Correspondingly, on the side of the inner edge, the top surface of the section forming the body is higher than on the side of the outer edge, whereby, on the side of the outer edge, the top surface is bent downwards at an angle $\beta$. In relation to the angle $\alpha$, the angle $\beta$ is preferably $\beta=90-\alpha$ degrees. This structure and the measures thereof provide the advantage that similar circuit plates can be used on the connection base for connecting a star connection or a delta connection, and thus only three circuit plates are required. In addition, in a star connection, all the three circuit plates can be mounted on top of one another, whereupon the star point does not heat so much and the circuit plates are kept safe.

The connection base of the invention also provides the advantage that in the structure of the invention, the terminals are largely in contact with the body. As a result, the terminals are cooled effectively, as the heat passes easily from the copper parts of the terminal to the plastic body of the connection device.

Another advantage is that the body is made of a thermoplastic material that can be recycled and used again, which makes it an ecological material. Also, the amount of copper required for the terminals and circuit plates is 30 to 40% smaller than in the known solution.

BRIEF DESCRIPTION OF THE INVENTION

In the following, the invention will be described in greater detail by means of the attached drawings, in which.

DESCRIPTION OF THE PREFERRED EMBODIMENT

FIGS. 1 to 12 illustrate an example of the structure and operation of a connection base according to a typical preferred embodiment.

Figure 1:
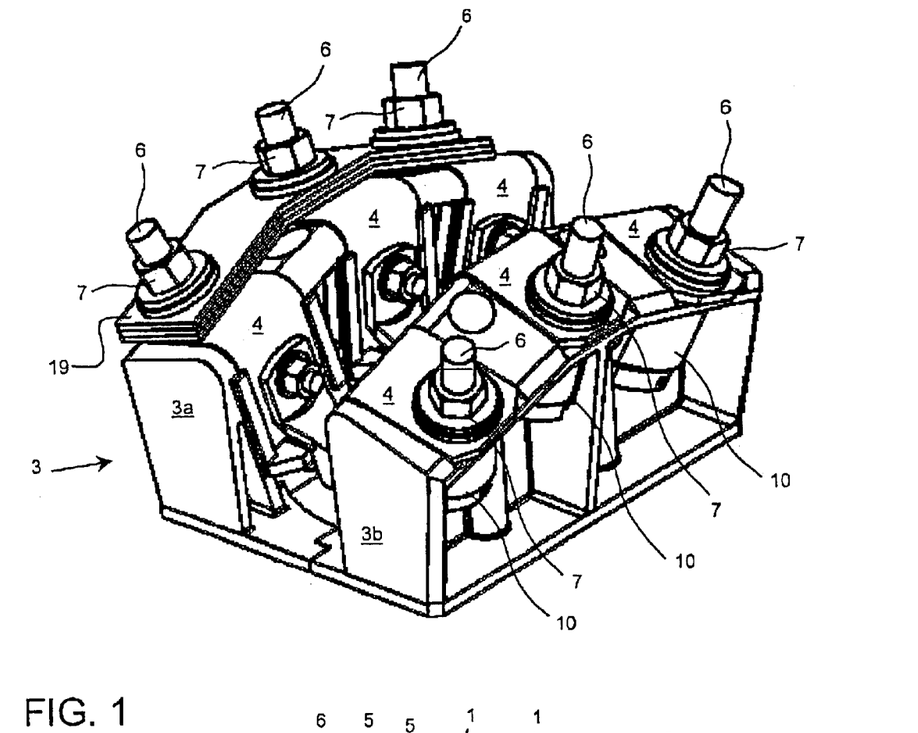
FIG. 1 is a perspective view of a connection base according to an embodiment of the invention and connected to a star connection.

FIG. 1 is a perspective view of the structure of an embodiment of a connection base. Such a connection base is suitable for a three-phase electric motor. The connection base comprises a body 3 and terminals 4 therein. There are six terminals 4 for connecting the three-phase motor, and thus the motor can be connected either to a star connection (Y connection) or a delta connection (D connection). According to FIGS. 2 to 4, phase leads 2 coupled to the electric motor windings are connected to a first joint surface 41 of the terminals 4, and current supply cables 1 from a centre supplying the electric motor are connected to a second joint surface 42. In other words, the connection base acts as a connection point, at which the current supply cables 1 are coupled to the phase leads 2 of the electric motor windings. On the connection base, by changing the position of structural elements, i.e. circuit plates 19, of the connection base, the electric motor can be connected either to a star connection or a delta connection. The connection base is placed into a junction box of the electric motor.

According to FIG. 1, the body 3 of the connection base preferably comprises two similar sections 3a and 3b. The sections are positioned next to each other so that their highest edges, i.e. inner edges D, are opposite each other, thus forming the body 3 of the connection device. The body 3 is preferably made of a recyclable thermoplastic material by injection moulding. The body 3 is made of an electrically insulating material. As the sections are similar in shape, they can preferably be manufactured by using the same mould.

Figure 7:
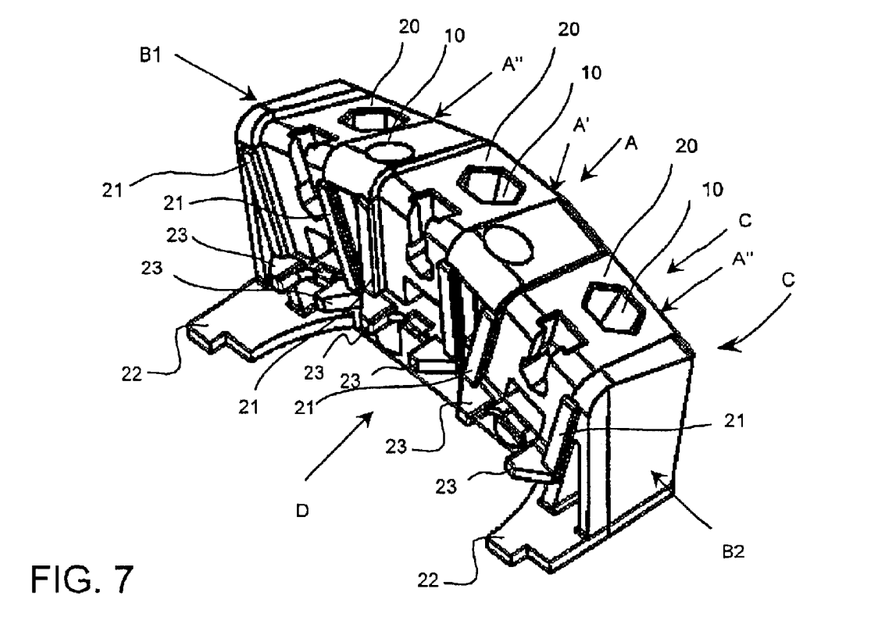
FIG. 7 is a perspective view of a half of the body of the connection base according to FIG. 1.

FIGS. 7 to 11 show the structure of an embodiment of the section 3a, 3b forming a half of the body 3 in more detail. FIG. 7 shows that the section is a three-dimensional elongated thermoplastic object. The section thus comprises a top surface A, a first end B1, a second end B2, an outer edge C, an inner edge D and a bottom surface E. The bottom surface E is a surface to be set against a mounting base, such as a flange 17. The bottom surface comprises projecting lugs 22, which define the distance between the sections when two similar halves 3a, 3b are set next to each other so that the inner edges D are opposite each other to form the body 3.

The body 3 comprises mounting spaces 20 for three parallel terminals 4. The mounting spaces 20 for the terminals 4 consist of ribs 21 at the inner edge D for receiving a terminal 4 and recesses at the inner edge D and on the top surface A, having the size of the terminals 4 and being shown in FIGS. 8 to 10. Naturally, this kind of shape is only one way of implementing the mounting space 20 for a terminal 4. The ribs also provide insulation at the terminal 4 edges, which lengthens the insulation layer between the parallel terminals and makes the creepage distance of surface currents longer.

The terminal 4 is arranged in the mounting space 20 by inserting the terminal from the direction of the top surface A into a slot between the ribs 21 at the inner edge D and the wall of the mounting space 20. When the body 3 is in its position of use, i.e., the bottom surface E against the mounting base, and the terminal is in the mounting space, the majority of the terminal's surface area is supported on the inner edge D of the body 3 and on the top surface A of the body 3 in the mounting space 20. In addition, at the inner edge D immediately under the mounting space 20 there are guiding lugs 23, between which the base of a cable lug 11 of a phase lead 2 is set and which guide the phase leads 2 in to a certain direction and prevent the phase leads from being mounted too near each other.

Figure 8:
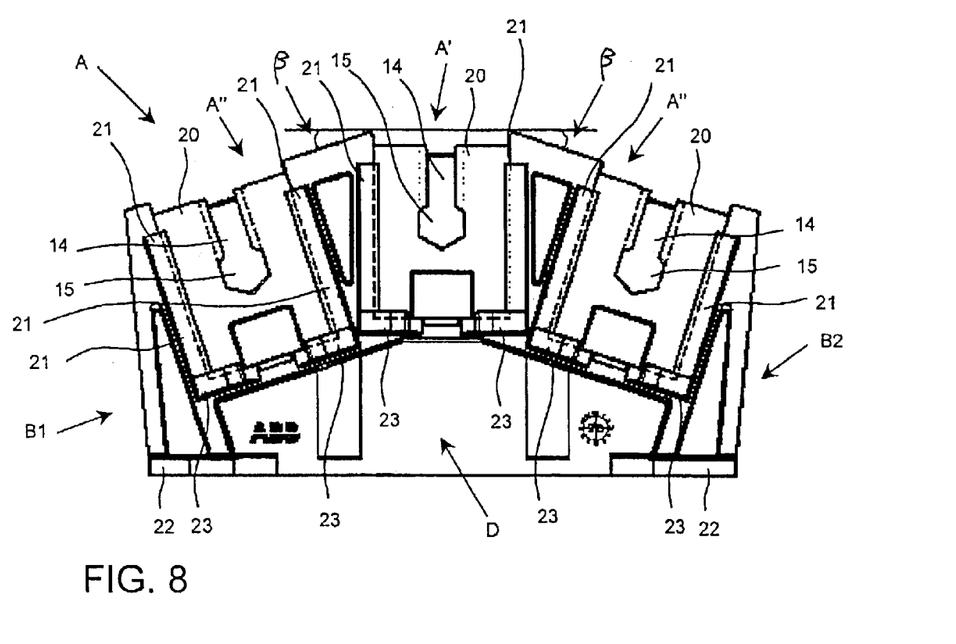
FIG. 8 shows the half of the body of the connection base according to FIG. 1, viewed from the direction of the inner edge.
Figure 9:
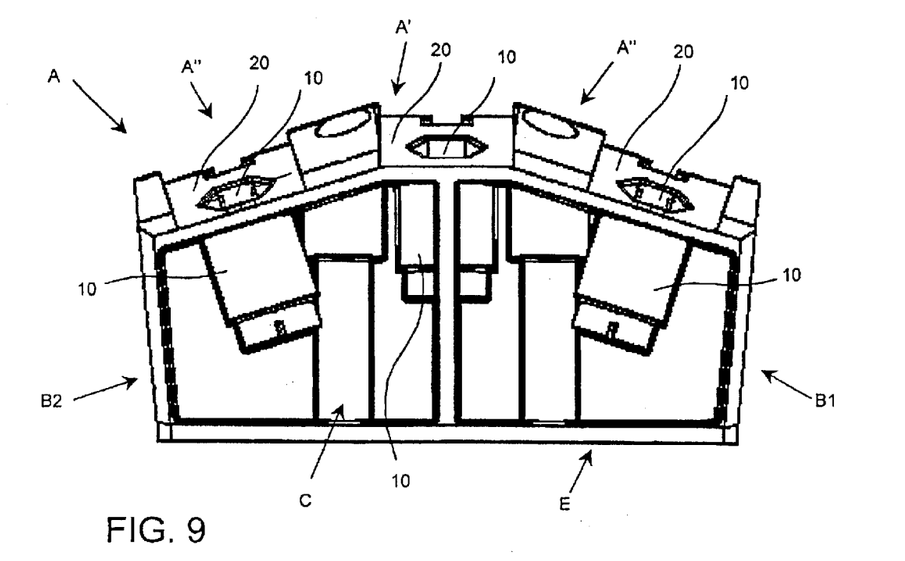
FIG. 9 shows the half of the body of the connection base according to FIG. 1, viewed from the direction of the outer edge.
Figure 11:
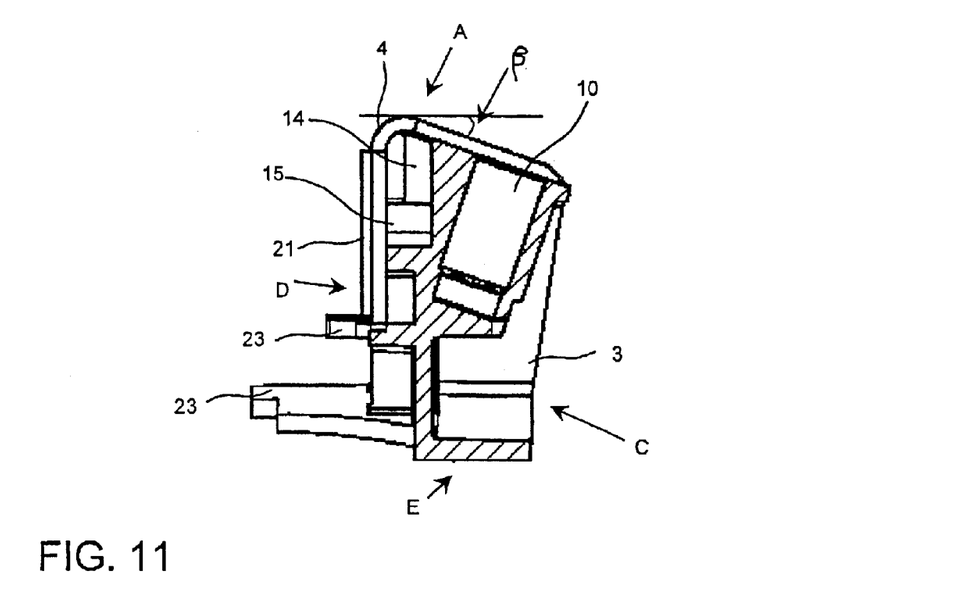
FIG. 11 shows the half of the body of the connection base according to FIG. 1 in cross-section, viewed from a cavity for a fastening screw of a current supply cable.
Figure 12:
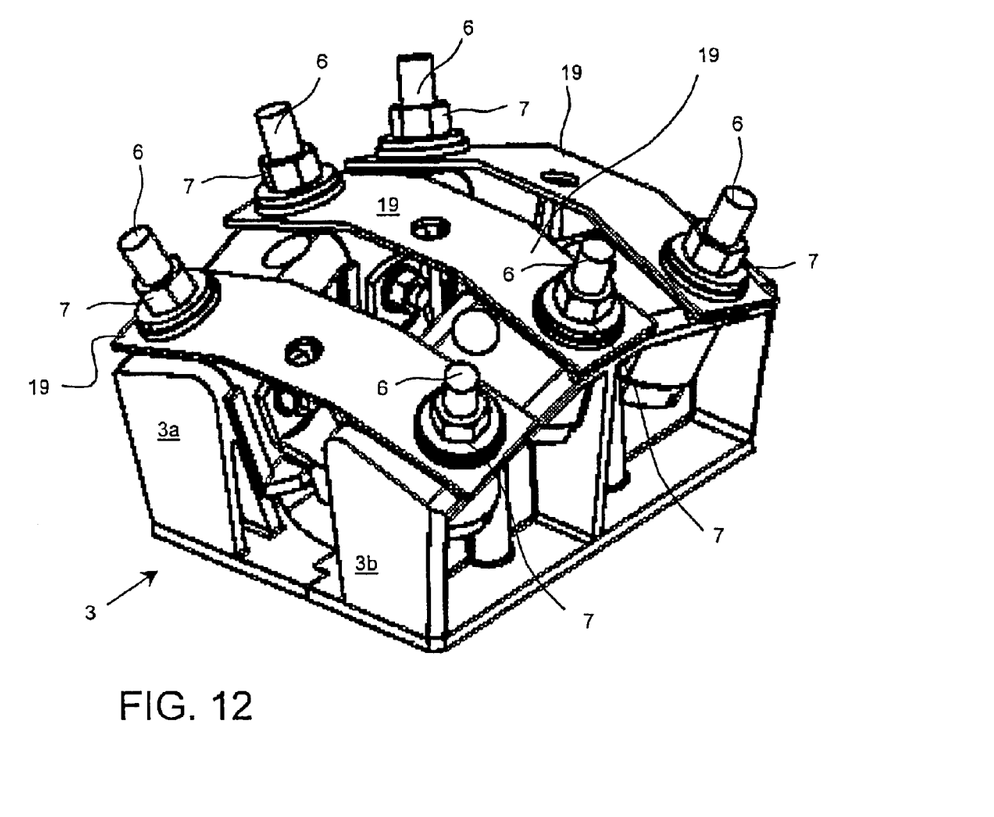
FIG. 12 shows the connection base according to FIG. 1, connected to a delta connection.

As FIGS. 7, 8 and 9 show, the profile of the top surface A of the body 3, when viewed from the direction of the inner edge D and the outer edge C, is angular. At the terminal 4 in the middle, the centre plane A' of the top surface A and the mounting space 20 therein are higher than the mounting spaces 20 for terminals 4 on the sides. At the mounting spaces 20 for terminals 4 on the sides, the side surfaces A" of the top surface A are bent according to the embodiment at an angle of 17 degrees downwards, which means that at its centre point A', the body 3 is higher than the sides A". As FIG. 11 shows, also on the side of the inner edge D, the top surface A of the half of the section forming the body 3 is higher than on the side of the outer edge C. On the side of the outer edge C, the top surface A is, according to the embodiment, bent at an angle of 17 degrees downwards, which means that the inner edge D of the body 3 is higher than the outer edge C. It is essential that both bending angles described above are substantially equal. Naturally, the size of the angle of the above mentioned bends can be other than 17 degrees.

Figure 5:
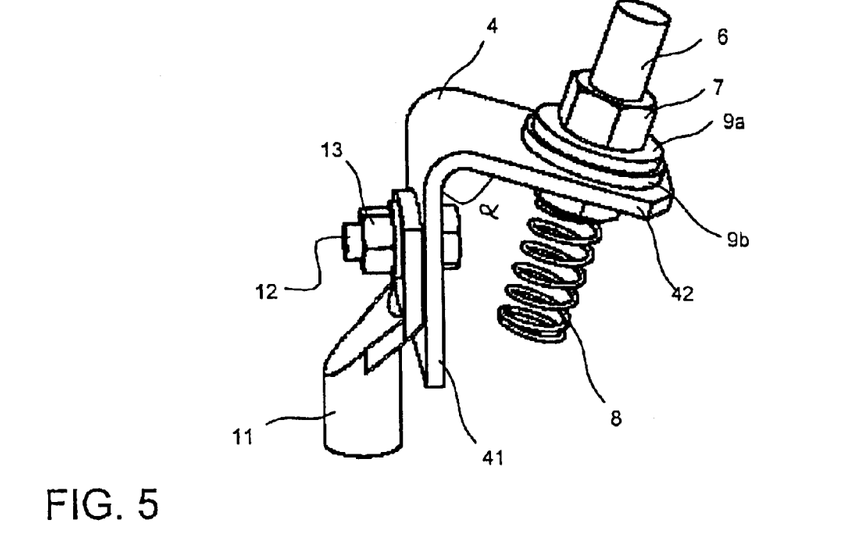
FIG. 5 shows the structure of a terminal of the connection base according to FIG. 1.

FIG. 5 shows the structure of a terminal 4 according to an embodiment. The terminal 4 is made of metal, preferably copper. The terminals can be made of pure copper, being suitable for connecting copper conductors, or the terminals can also be made of tin-foiled copper, in which case they are suitable for connecting aluminium conductors. The terminal 4 has a flat shape and approximately at its centre point the terminal is bent to form an angle $\alpha$, which is preferably in relation to the angle $\beta$ between the top surface A of the body 3 and the inner edge D according to the formula $\alpha=90-\beta$, the angle $\alpha$ thus being 73 degrees. Thus, the terminal preferably comprises two projections, i.e., projection 41, i.e., a joint surface for the phase lead 2, set against the inner edge D of the mounting space 20, and a projection 42, i.e. a joint surface for the current supply cable 1, set against the top surface A. The projection 41 comprises an opening for receiving a fastening means 12, 13, such as combination of bolt 6 and nut 7, which fastens the current supply cable 1 to the terminal 4. This fastening means also acts as a fastening means for locking the terminal 4 in its place at the body 3.

Correspondingly, the projection 42 comprises an opening for receiving a fastening means 6, 7, such as a combination of bolt 6 and nut 7, which fastens the current supply cable 1 to the terminal 4. In the projection 42 of the terminal 1 receiving the current supply cable 1, the bar edges of the connection bar end comprise bevels 4a of about 30 degrees. Their purpose of these bevels is to facilitate the mounting of the cables and allow the cable lug 5 of the current supply cable 1 to be directed somewhat obliquely to the terminal 4.

Figure 4:
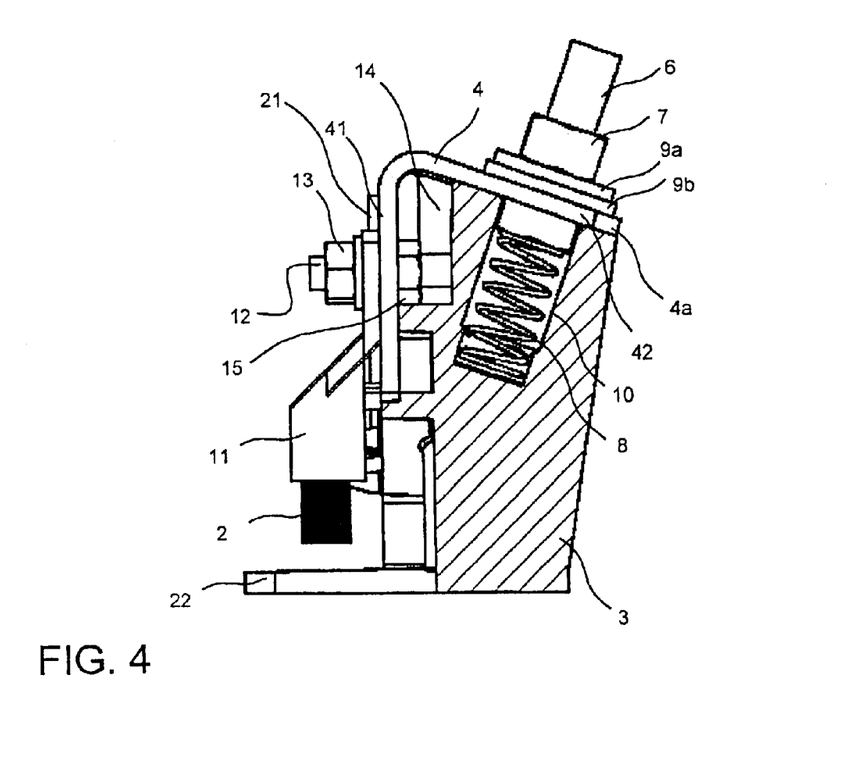
FIG. 4 is a cross-section of a half of the connection base according to FIG. 1.

FIG. 4 shows an embodiment, in which a terminal 4 is arranged at the body 3, in more detail. According to FIGS. 4, 8 and 10, in the body 3, the mounting space 20 for the terminal near the inner edge D comprises a groove 14, through which the fastening means 12 together with the terminal 4 are led to the cavity 15 at the groove 14 bottom, the cavity having a shape similar to the base of the fastening means 12 and penetrating the surface of the inner edge D. The terminal 4 is locked in its place in connection with the body 3, as the fastening means 12, i.e. the bolt 12, is pulled towards the terminal 4 and is set in its place in the cavity 15, which prevents the fastening means from moving towards the top surface A. The ribs 21 keep the terminal 4 against the body 3. Thus, arranged in the slot formed by the ribs 21 and locked immovably by the fastening means 12, 13 of the phase lead 2, the terminal 4 is fastened to the body 3. As the phase lead 2 from the cable lug 11 is fastened to the terminal 4 by means of a fastening means comprising a bolt 12 and a nut, also the terminal 4 is locked in its place in the body 3. In addition, this way of fastening does not have any structure where the plastic of the body 3 would be pressed between two metal parts. Another possible model to implement a similar fastening means is to form only a cavity 15 of the shape of the fastening means, such as a nut 13, at the inner edge D of the mounting space 20 in the body 3, whereby the nut 13 is set to the cavity before the terminal 4 is inserted into the slot. The phase lead 2 is fixed in its place by pushing the bolt 12 through a mounting hole of the cable lug 11 and an opening in the terminal, whereby the nut 13 acts as a counterpart to which the bolt 12 is fastened so that it fastens the terminal 4 to the body 3 in a manner similar to the one described above.

Figure 3:
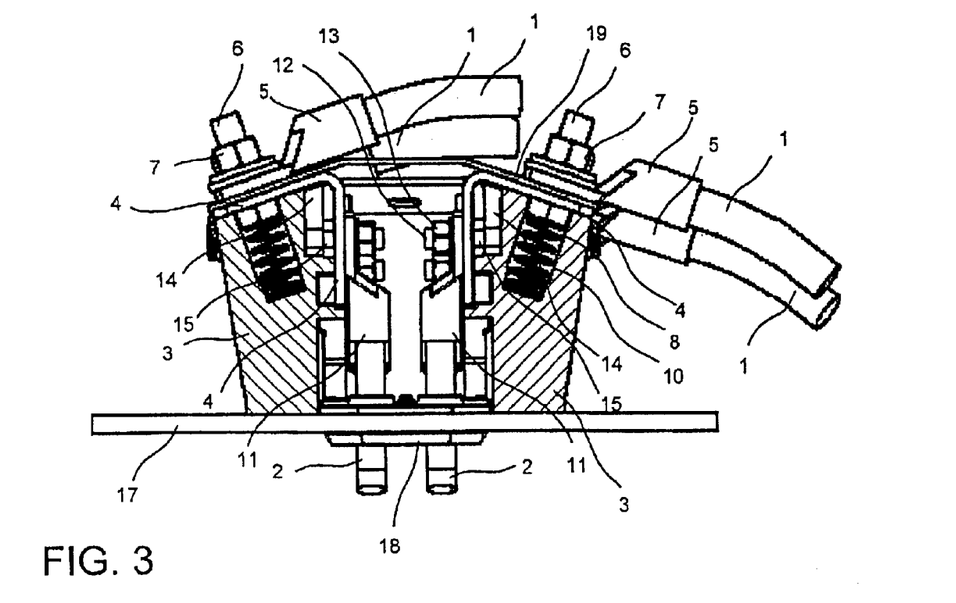
FIG. 3 is a cross-section of the connection base according to FIG. 1, mounted on a flange and connected to a delta connection.
Figure 10:
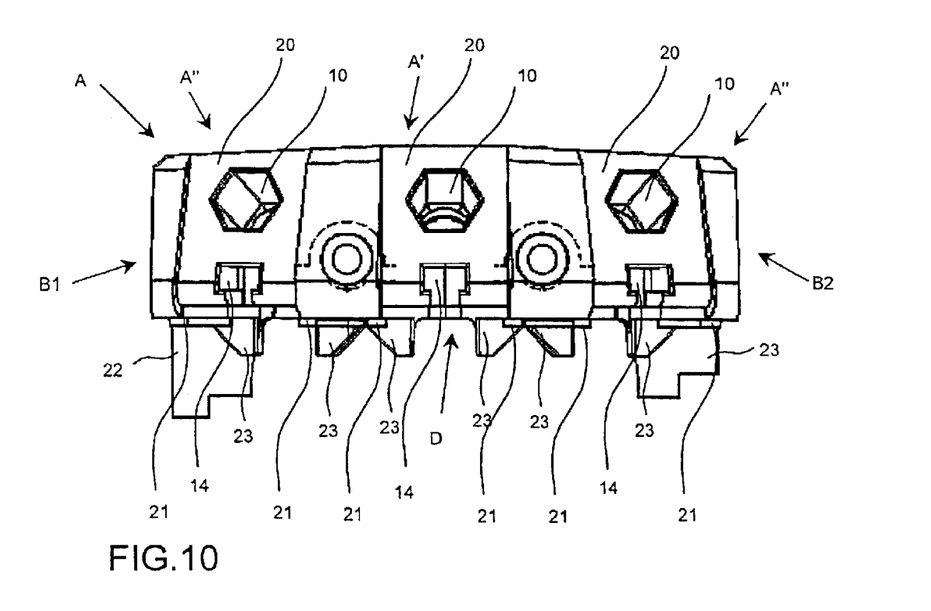
FIG. 10 shows the half of the body of the connection base according to FIG. 1, viewed from the direction of the top surface.

Furthermore, FIGS. 3, 4 and 10 show that in the mounting space 20 for the terminal on the top surface of the body 3, there is a cavity 10 which has the shape of the base of the fastening means 6, 7 and which is directed from the top surface A towards the bottom surface E. It is intended for receiving the fastening means 6, 7, i.e. the combination of bolt 6 and nut 7, by which the current supply cable 1 is fastened to the terminal 4. The depth of the cavity 10 roughly corresponds to the size of the bolt 6. The head of the bolt 6 in the cavity 10 faces the bottom of the cavity 10. A spring 8, preferably a helical spring, is also mounted in the cavity 10. The purpose of the spring 8 is to support the bolt 6 and press the bolt 6 in its settled position to the upper part of the cavity 10 so that the head of the bolt 6 is against the terminal 4. The fastening means 6, 7 also comprises a spring washer 9a and a washer 9b, by means of which heat expansion of the cable lug 5 at the end of the current supply cable 1 mounted at the terminal 4 can be compensated. Thus, the connection base can be used for connecting both copper and aluminium cables the connection base complying with the mounting requirements defined in Finnish national standards SFS 2663 and SFS 3739. Naturally, in the above structure, the places of the bolt 6 and the nut 7 can also be changed so that the nut 7 is arranged to be supported by the spring 8 in the cavity 10 and the bolt 6 is mounted from above when the current supply cable 1 is connected to the terminal 4.

Figure 6:
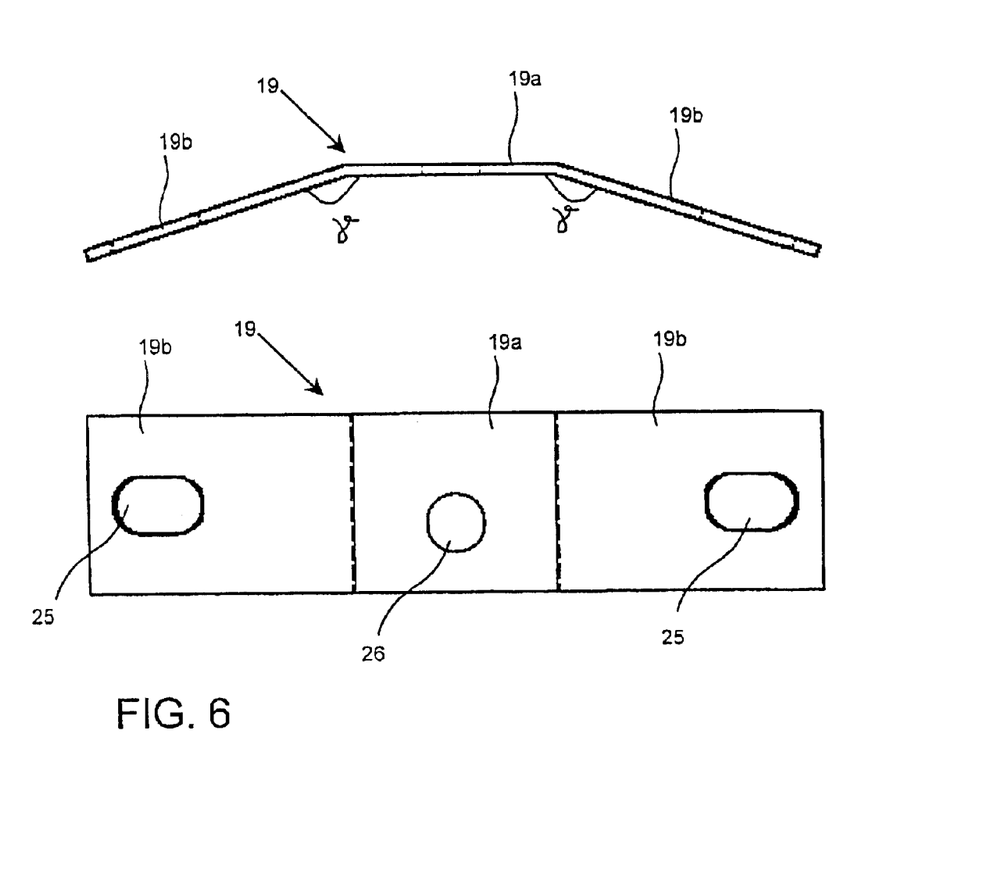
FIG. 6 shows the structure of a circuit plate of the connection base according to FIG. 1.

The spring 8 also allows the longitudinal up-and-down movement, i.e. the elasticity, of the bolt 6 in the cavity 10, which is a significant property when circuit plates 19 are mounted. FIG. 6 shows the structure of a circuit plate 19. The circuit plate 19 is a flat copper bar, which is bent to be angular so that its shape corresponds to the shape of the top surface A of the body 3. Thus, the centre point 19a of the circuit plate 19 is higher than the ends 19b thereof when the circuit plate is in its place. In this embodiment, the angle between the centre point 19a and the ends 19b corresponds to the shape of the top surface A of the body 3, i.e. β=17 degrees. The angle of bending according to this embodiment is advantageous, because, in this case, the order, in which the connection bolts of the current supply cables 1 are tightened, is not essential, but they may be tightened in a desired order. The ends 19b of the circuit plate are provided with elongated openings 25 on the axis of the circuit plate, through which openings the connection bolts 6 of the current supply cables 1 are led. At the centre point 19a of the circuit plate 19 there is also an opening 26, which is somewhat to the side of the axis line of the circuit plate 19. When a star connection is used, the connection bolt 6 of the current supply cable 1 in the middle is led through the opening 26.

Three circuit plates 19 are required in the connection base, and they have an identical shape. The circuit plates 19 are made of copper. The circuit plates 19 can be made of pure copper and be suitable for connecting copper conductors, or they can also be made of tin-foiled copper, being suitable for connecting aluminium conductors. Circuit plates 19 are used for connecting the electric motor to a star or a delta connection. In the star connection, all circuit plates 19 are set on top of one another and lengthwise over one half of the body 3, whereby a star point for the connection is provided on that side of the body 3. Correspondingly, the current supply cables 1 are connected to the other half of the body 3. In the delta connection, all three circuit plates 19 are set one by one crosswise over both halves of the body 3. The current supply cables 1 are connected to either one of the body 3 halves. If the motor is a high-powered electric motor demanding a high power supply current, two parallel current supply cables 1 can be laid for the motor and they can be connected to the terminals 4 on both sides of the body 3, as shown in FIGS. 2 and 3.

In the connection base according to the embodiment, the shape of the top surface A of the body 3, comprising bevels of 17 degrees both towards the ends B1, B2 of the body 3 and towards the outer edges C, the angular shaping of the circuit plates 19, comprising bevels of 17 degrees between the ends 19b and the centre part 19a, and the angle of 73 degrees between the projections 41 and 42 of the terminals 4 enable that by using three identical circuit plates 19, both a star and a delta connection can be implemented in the connection device. This solution also provides the advantage that if two parallel current supply cables 1 are led to the connection base from the same side, no separate elevation parts are required when the cables are connected to the terminals 4 of the connection base 4.

Figure 2:
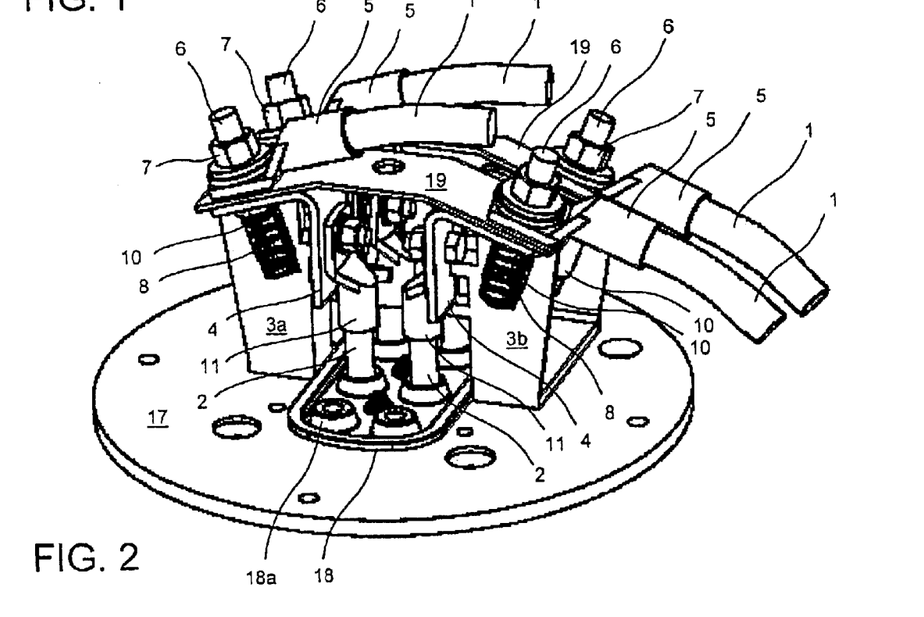
FIG. 2 is a perspective cross-section of the connection base according to FIG. 1, mounted on a flange and connected to a delta connection.

According to FIG. 2, a rubber sealing 18 comprising holes 18a for the conductors 2 can be mounted either in connection with the connection device at the opening of the flange 17, or, if the connection base is mounted directly at the bottom of the junction box of the electric motor, at the junction box opening, from which the phase leads from the motor are inserted to the terminals of the connection device. The sealing provides the advantage that no impurities, dust or moisture pass into the motor to damage its operation. At the same time, the rubber sealing 18 protects the phase leads so that no separate protection, such as a shrink-plastic protection, is required at the hole. The rubber sealing 18 also comprises separate holes for an auxiliary device conductors.

It is to be understood that the above description and the related figures are only intended to illustrate the present invention. Thus, the invention is not restricted only to the embodiment described above or defined in the claims, but many different variations and modifications of the invention, which are possible within the inventive idea defined in the attached claims, will be apparent to the persons skilled in the art.

What is claimed is:

1. A connection base to be used for connecting current supply cables of an electric motor to phase leads of electric motor windings, comprising:

a body made of an insulating material and terminals coupled to the body, each terminal comprising at least one angle (α) and at least a first projection and a second projection on the opposite sides of the angle (α), with first reception means for receiving at least the first projection of the terminal and for keeping it in connection said first projection comprising fastening means for fastening said phase leads to the terminal, whereas the body is provided with spaced mounting ribs extending from the body receiving at least the first projection of the terminal when slid along the body, thus keeping said terminal in connection with the body, the body furthermore including reception devices essentially parallel with said mounting ribs, each of these reception devices receiving one of said fastening means arranged to penetrate the first projection of the terminal, the fastening means being slid through a groove of the reception device to a cavity thereof as the terminal is slid along the body fixing the terminal to the mounting ribs, said terminal being locked in connection with the body when the phase lead is fastened to the terminal as an end of the fastening means facing the body of the connection base is rendered essentially fixed in the cavity of the reception device locking the terminal to the body, an end of the phase lead being lockingly connected to an opposite end of the fastening means.

2. A connection base as claimed in claim 1, wherein the body comprises two similar three-dimensional sections which are made of an electrically insulating material.

3. A connection base as claimed in claim 2, wherein the body is made of a thermoplastic material by injection moulding.

4. A connection base as claimed in claim 2, wherein each said three-dimensional section forming the body comprises a top surface, a first end and a second end, an outer edge, an inner edge and a bottom surface, the bottom surface being a surface to be set against a mounting base, whereby the inner edge of the section is provided with mounting ribs for receiving the first projection of the terminal and for keeping said terminal in connection with the body.

5. A connection base as claimed in claim 1, wherein the shape of the cavity corresponds to the base fastening means.

6. A connection base as claimed in claim 4, wherein there are third reception devices for receiving fastening means of the current supply cable on the top surface of the body, these reception devices comprising a cavity provided on the top surface, a cross-section of the cavity corresponding to a shape of a base of said third fastening means.

7. A connection base as claimed in claim 6, wherein each reception device is provided with a spring element whose length is substantially equal to a depth of the reception means, which spring element supports the fastening means.

8. A connection base as claimed in claim 1, wherein the angle ($\alpha$) between the first projection and second projection of the terminal is less than 90 degrees.

9. A connection base as claimed in claim 4, wherein the profile of the top surface of the section forming the body is angular when viewed from the direction of the inner edge, whereby a centre part of said section is higher than the side parts of this section and the side parts of the top surface of said section are bend downwards at an angle ($\beta$) to the centre part.

10. A connection base as claimed in claim 9, wherein the top surface of the section forming the body is higher than on the side of the outer edge on the side of the inner edge, whereby, on the side of the outer edge, the top surface is bend downwards at an angle ($\beta$).

11. A connection base as claimed in claim 9, wherein the angle ($\beta$) is in relation to the angle ($\alpha$), whereby substantially $\beta = 90 - \alpha$ degrees.

12. A connection base as claimed in claim 1, wherein the connection base comprises three circuit plates for achieving a star or a delta connection.

13. A connection base as claimed in claim 12, wherein the circuit plate is bent to be angular, whereby a centre part of said circuit plate is higher than the end parts thereof when the circuit plate is placed to the connection base, and an angle ($\gamma$) between said centre part and the end parts is in relation to the shape of a top surface of the body, whereby substantially $\gamma = 180 - \beta$ degrees.

* * * * *